May 19, 1953 F. C. WILLIAMS ET AL 2,639,419

ELECTRONIC SIGNAL TRACKING CIRCUITS

Filed Aug. 6, 1947 7 Sheets-Sheet 1

F.C. WILLIAMS &
N.F. MOODY
*Inventors*

By [signature]
*Attorney*

May 19, 1953 F. C. WILLIAMS ET AL 2,639,419

ELECTRONIC SIGNAL TRACKING CIRCUITS

Filed Aug. 6, 1947 7 Sheets-Sheet 2

*Inventors*
F. C. Williams
N. F. Moody
By Nelson Moore
Attorney

ELECTRONIC SIGNAL TRACKING CIRCUITS

Filed Aug. 6, 1947 7 Sheets-Sheet 3

Inventors
F. C. Williams
N. F. Moody
By Nelson Moore
Attorney

May 19, 1953 F. C. WILLIAMS ET AL 2,639,419

ELECTRONIC SIGNAL TRACKING CIRCUITS

Filed Aug. 6, 1947 7 Sheets-Sheet 4

Inventors
F. C. Williams
N. F. Moody
By Nelson Moore
Attorney

Inventors
F. C. Williams
N. F. Moody
By Nelson Moore
Attorney

May 19, 1953 F. C. WILLIAMS ET AL 2,639,419

ELECTRONIC SIGNAL TRACKING CIRCUITS

Filed Aug. 6, 1947 7 Sheets-Sheet 6

*Inventors*
F. C. Williams
N. F. Moody
By Nelson Moore
Attorney

*Inventors*
F. C. Williams
N. F. Moody
By Nelson Moore
*Attorney*

Patented May 19, 1953 2,639,419

UNITED STATES PATENT OFFICE 2,639,419

ELECTRONIC SIGNAL TRACKING CIRCUITS

Frederic Calland Williams, Timperley, and Norman Frank Moody, Cuffley, England, assignors to the Minister of Supply in His Majesty's Government of the United Kingdom of Great Britain and Northern Ireland, London, England Application August 6, 1947, Serial No. 766,652
In Great Britain June 22, 1945

14 Claims. (Cl. 343—7)

The present invention relates to circuit arrangements for providing a control voltage when the relative timing of a recurrent input signal and a locally generated recurrent signal is such that the two signals co-exist for at least a part of their duration.

The object of the invention is to provide circuit arrangements of the above type which are more reliable in operation than previous arrangements and, in particular, which are not substantially affected by a reduction in the amplitude or strength of the input signal such as may occur, for instance, where radio signals, which are liable to fading, are involved.

According to the invention, a varying control voltage proportional to the degree of co-existence of the two signals is developed and, if the amplitude of the input signal falls below a minimum level necessary for the generation of the control voltage, a local circuit is rendered effective to provide a further control voltage equal or approximately equal to that which obtained prior to the input signal falling below said minimum level.

The invention has application to a number of different arrangements. For instance, the timing of the locally generated signal may be fixed while that of the input signal is variable. Alternatively the timing of both the locally generated signal and the input signal may be variable.

Further the control voltage may be employed for a number of different purposes. For instance, it may be employed for causing an indication of the input signal to be given on a cathode ray tube. The input signal may exist alone or it may be one of a number of co-existing signals and, if suitable means are provided for selecting a particular signal, the arrangement enables the variation in timing of a particular one of a number of recurrent input signals to be examined. Alternatively or in addition the control voltage may be employed for maintaining the co-existence of the input signal and the locally generated signal, so that a recurrent indication is given of the variation in timing of the input signal. Finally the control voltage may, when it attains a predetermined value, cause the transmission of a further signal or set an additional circuit in operation.

The invention has particular application to radio-location equipment in which the input signal is produced by the reflection of a high frequency pulse-modulated carrier wave by a distant object, such as an aircraft, and an indication of the reflected or echo signal is displayed on the screen of a cathode ray tube. Usually a linear time-base, synchronised with the transmitted pulse, is displayed on the screen of the cathode ray tube and, when the input or echo signal and the locally generated signal co-exist or overlap, the echo signal is displayed as a modification of the time-base trace to provide the range of the aircraft.

It should be pointed out that where the term "echo signal" is employed it should be understood to include a signal radiated by a transmitter in the aircraft in response to the reception in the aircraft of the pulse-modulated carrier wave.

In one arrangement to which the invention may be applied, the timing of the locally generated signal is automatically varied progressively until the locally generated signal and the echo signal overlap when the control voltage is generated and an indication is provided on the screen of a cathode ray tube. The subsequent timing of the locally generated signal is controlled by the control voltage so that a recurrent indication of the echo signal is obtained.

Alternatively the timing of the locally generated signal may be adjusted manually until it overlaps the echo signal, whereupon, either automatically or by the operation of a switch or the like, the subsequent timing of the local signal is effected by the control voltage so that the overlap between the two signals is maintained.

In a further arrangement to which the invention may be applied, the timing of the locally generated signal is manually adjusted to a predetermined value and a control voltage is developed when the timing of the echo signal is such that the two signals overlap. The control voltage is employed for providing an indication of the echo signal and also for modulating the transmitted carrier wave to enable the aircraft to follow a predetermined course, i. e. for the purpose of maintaining the overlap of the two signals. The timing of the locally generated signal is adjusted so that it corresponds to the range of the target and the signals transmitted to the aircraft enable it to follow a course which passes over the target i. e. the overlap between the locally generated signal and the echo signal is maintained.

In a further arrangement, the timing of the locally generated signal is not fixed but is automatically varied until the two signals overlap, a second locally generated signal being employed, the timing of which is adjusted to a fixed value representing the target range. The circuit in this case is so arranged that when the echo signal and the locally generated signal overlap, the timing of the locally generated signal is effected by the control voltage and at the same time the carrier wave transmitted to the aircraft is modulated to enable the aircraft to follow a course such that the timing of the echo signal and the locally generated signal approach that of the second locally generated signal i. e. the aircraft follows a course which passes over the target.

The invention may also be applied to radiolocation equipment employing the principle of "automatic following." For instance the equipment may be mounted on an aircraft for detecting other aircraft for interception purposes. The transmitting and receiving polar diagram of the equipment takes the form of a beam and arrangements are provided for causing the beam to scan a certain field of view. When an echo signal is received, the regular scanning movement is terminated and the beam is caused to be continually incident on the echo-reflecting aircraft substantially irrespective of the movement of both aircraft. Such irregular movement is controlled by a voltage dependent upon the degree of overlap between the echo signal and a locally generated signal.

It will be seen that all these arrangements, which involve some form of "following," depend for their success upon the development of a control voltage due to the overlapping of the echo signal and the locally generated signal. In the absence of the present invention this control voltage will only be developed if the amplitude of the echo signal is above a certain minimum value. If the echo signal disappears entirely, for instance, due to fading, the control voltage will likewise disappear and the timing of the locally generated signal will, for example, revert to its original progressive variation or will remain at the value which obtained when the echo signal disappeared. The locally generated signal may be said to be "locked" to the echo signal when the two overlap and subsequently to "follow" the echo signal. If the echo signal fades, the locally generated signal will become "unlocked" and will not again lock to the echo signal until some adjustment has been made when the fade has ended. The examination of the echo signal is thus not possible during this period. When the present invention is applied to such arrangements, the constant control voltage which is locally generated is made available and, unless the fade is of very long duration, increases the possibility of the locally generated signal being still locked to the echo signal when the latter reappears.

According to a feature of the invention, the circuit arrangements comprise means for generating a local signal consisting of two substantially square waveforms having coincident front or trailing edges and different widths, means for obtaining a current proportional to the degree of co-existence of the input signal with one of said square waveforms and for obtaining a second current in opposition to said first current and proportional to the degree of co-existence of the input signal with the second of said square waveforms and means for deriving a control voltage in accordance with the magnitude and sense of the resultant of said two currents.

In one embodiment of the invention the control voltage is fed to a load circuit and also to a condenser which is thereby charged to a voltage equivalent to the mean value of the control voltage and if the amplitude of the input signal falls below a predetermined minimum value, the condenser is arranged to discharge through the load so that a substantially constant control voltage equal to the mean value is obtained. The condenser may be connected in a circuit which includes contacts of a relay, the operation of which is controlled in accordance with the strength of the incoming signal.

The invention will be better understood from the following description of one embodiment as applied to a system of radio navigation taken in conjunction with the accompanying drawings in which.

Briefly, the radio navigational system to which the invention is applied consists of a ground station which radiates to an aircraft signals which are modulated in accordance with the instantaneous distance between the ground station and the aircraft and in accordance with the rate of change of said distance. The modulation of said signals is determined by information return by the aircraft in the form of echo or counterpart signals and the reception of the modulated signals in the aircraft enables a predetermined path to be followed. In previous arrangements of this nature, the predetermined path was a circle with the ground station at the centre and the signals transmitted by the ground station were modulated in accordance with the distance of the aircraft from the predetermined path, a distance known as the "residual range" of the aircraft. It has been found that a better approach is obtained if the transmitted signals are modulated not only in accordance with the residual range but also with the rate of change of the residual range. The predetermined path is then exponential with regard to time and is asymptotic to the circular path. When employed for the purpose of blind bombing, the predetermined path is arranged to pass over the target and a second ground station is provided for transmitting a bomb-release signal at the appropriate instant. The first-mentioned ground station is referred to as station A or the "tracking" station while the second-mentioned ground station is referred to as Station B. Both stations are capable of operating either as an A or B station but the present invention is primarily of value for station A operation and the description will be confined to the operation of such station.

Two cathode ray tubes are provided at each station, one of which displays a magnified portion of the time-base trace of the second. The first of said tubes is termed the magnified time-base tube while the second is termed the long time-base tube. The time-base traces are linear and horizontal and are calibrated to give residual range of the aircraft. Two pulses are displayed on the magnified time-base trace, one of which is known as the "target marker" pulse and means are provided for accurately setting the pulse to a position on the time-base trace representative of the range of the target. The second pulse is known as the "walking strobe" pulse the timing of which may be automatically varied according to the degree of overlap with the echo signal so that it remains locked to the echo signal. Voltages are also developed which are proportional to the residual range of the aircraft and also to the rate of change of said range. These two voltages are fed to a pulse width control unit for controlling the width of the transmitted pulses which thereby form a communication channel between the ground station and the aircraft.

Figure 1:
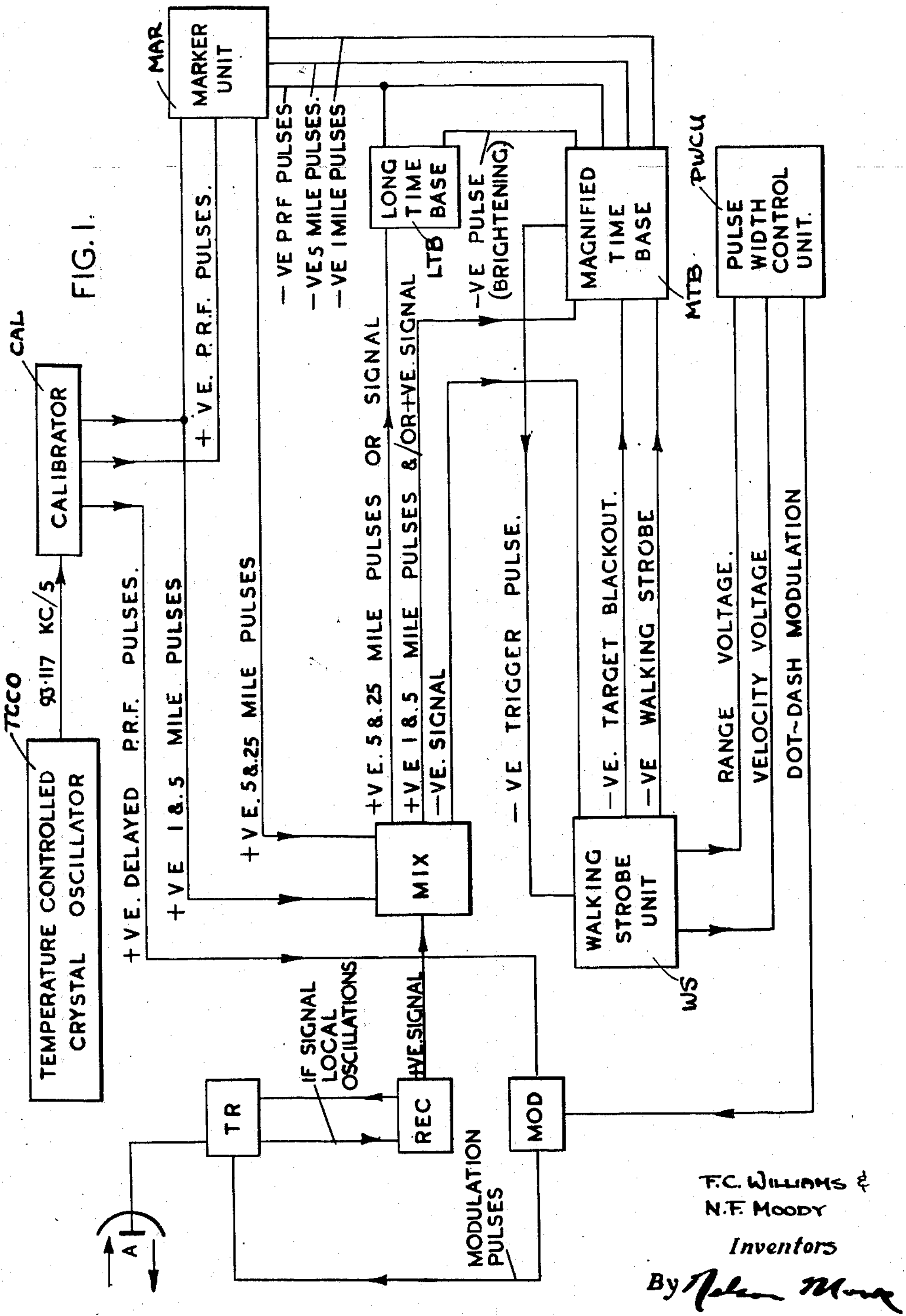
Fig. 1 shows a block schematic of the equipment.
Figure 2:
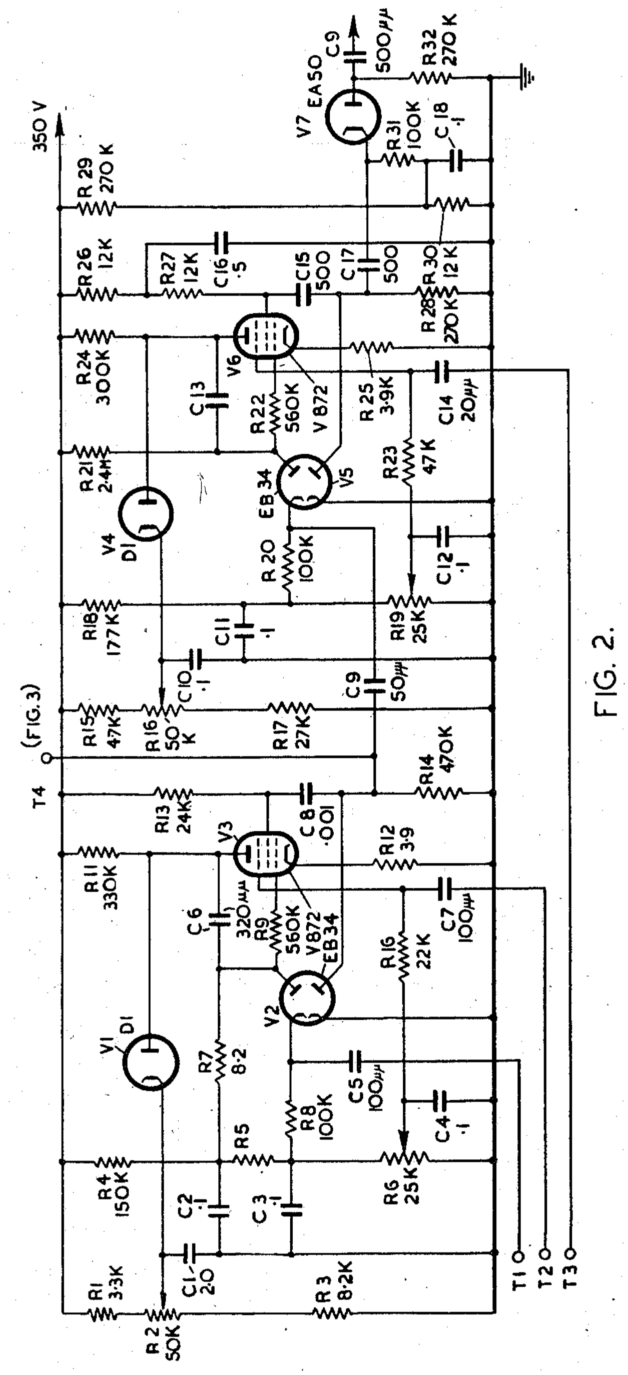
Fig. 2 shows part of the circuit of the magnified time base generator.

The equipment will first be described with reference to the block schematic diagram shown in Fig. 1. The operation of the equipment is under the control of a calibrator unit CAL to which is fed the output of the temperature controlled crystal oscillator TCCO. The frequency of the sine wave output from the unit TCCO is 93.117 kilocycles per second and by a process of division, employing circuits of the type disclosed in co-pending United States application, Serial No. 762,375 filed July 21, 1947, United States Patent No. 2,549,874 granted April 24, 1951, the sine waves are converted into square waves having the recurrence frequency of the station which in the particular embodiment is approximately 133 cycles per second. This recurrence frequency is obtained, for example, by a three stage division of 5, 14 and 10. The pulses generated at the station pulse recurrence frequency, or PRF pulses as they will be henceforth termed, are employed to trigger the transmitter and also the time base circuits LTB and MTB of the two cathode ray tubes. As regards the transmitter pulse this is delayed for a period of approximately 75 microseconds since otherwise it will be invisible on the cathode ray tube. The delayed pulses are fed to the modulator unit MOD.

The calibrator also provides a series of pulses which are applied to the signal deflection plates of the cathode ray tubes for calibration purposes. The frequency of the pulses is such that vertical deflections of the spot occur at intervals along the time base which represent a range of 1 mile. In addition the amplitude of every fifth mile pulse is increased so that the pulses provide, in effect, a series of 1 and 5 mile calibration pulses.

The PRF pulses and the calibration pulses are fed to a marker unit MAR, the chief function of which is to generate 25 mile calibration pulses from the 5 mile pulses, and to pass on calibration pulses and PRF pulses to other units. In particular the marker unit feeds negative-going PRF pulses to trigger the two time base circuits LTB and MTB while negative-going 1 and 5 mile pulses are fed separately to the time base circuit MTB. Finally 5 and 25 mile pulses are fed to the mixer unit MIX.

As previously mentioned two cathode ray tubes are employed one of which, the long time base tube, has a time base representing a range of 650 miles while the other, the magnified time base tube, enables a small portion of the long time base to be selected for presentation on an enlarged scale on this second tube. With maximum magnification, 2 to 2½ miles of the long time base may be made to cover the magnified time base, that is a scale of about 6 inches per mile may be obtained. Two additional scales on the second tube of 7 and 15 miles full deflection are also possible.

The following indications are given by the long time base trace:

(a) the transmitter pulse
(b) the return pulse at the appropriate range
(c) a brilliance marker or strobe pulse which indicates the portion of the time base displayed on the magnified time base tube
(d) if desired 5 and 25 mile calibration pulses.

The following indications are given by the magnified time base trace:

(a) a blackout pulse, known as the target marker, which may be accurately positioned to represent the range of the target.
(b) a brilliance pulse, known as the walking strobe, which may be locked to the return pulse and then moves along the time base as the range of the aircraft from the station varies.
(c) if desired 1 mile and 5 mile calibration pulses.

As pointed out previously the two time base circuits are triggered by negative-going PRF pulses obtained from the marker unit and the negative-going 1 and 5 mile pulses obtained from the same unit are fed to the magnified time base circuit for controlling the selection of the required portion of the long time base for display on the magnified time base tube. This operation is effected by delaying the time base triggering pulse in 5 mile and 1 mile steps behind the PRF pulses. An indication is given on the long time base of the portion selected for display on the magnified time base by an extra brightening pulse fed from the magnified to the long time base circuit.

The calibration pulses and return signals are fed to the two time base circuits from the mixer unit MIX. Positive going 1 and 5 mile pulses are fed to this unit direct from the calibrator unit while positive-going 5 and 25 mile pulses are fed to the mixer unit from the marker unit. Finally incoming signals are fed to the mixer from the receiver REC. Positive-going 5 and 25 mile pulses or the return signal are fed from the mixer through the long time base circuit to the Y deflection plates of the cathode ray tube (not shown).

Further positive-going 1 and 5 mile pulses and/or the return signal are fed from the mixer through the magnified time base circuit to the Y deflection plates of the cathode ray tube (not shown).

The walking strobe unit WS is fed with a negative-going return signal and also with a negative-going trigger pulse from the magnified time base unit MTB. The walking strobe unit has the following main functions:

(a) it provides a negative-going pulse, the "walking strobe" pulse, to the magnified time base unit: this pulse can appear on any portion of the magnified time base as intensity modulation. The walking strobe pulse actually consists of two pulses, one having twice the length of the other and having their front edges coincident, the arrangement being such that the strobe can be locked on to any echo returned by an aircraft which is moving with any speed up to 600 miles per hour in any direction.

(b) it supplies two voltages to the pulse width control unit PWCU, one of which voltages is linearly dependent upon the residual range of the aircraft while the other is linearly dependent upon the radial velocity: these voltages are employed to control the width modulation of the transmitted pulses to cause dot-dash signals to be heard in the aircraft headphones for navigational purposes.

A common transmitting and receiving aerial A is employed and the transmitter TR and modulator MOD may be of any suitable type to provide a carrier wave of approximately 10 cms wavelength, pulse modulated at a repetition frequency of 133 cycles per second, the mean pulse width being 3 micro-seconds while the minimum and maximum pulse widths are respectively 2 and 4 micro-seconds. Suitable switching arrangements are incorporated in the transmitter TR to prevent overloading of the receiver RFC by transmitted pulses and to prevent the return signals passing to the transmitter. Since the radio-frequency portions of the equipment form no part of the present invention, they will not be described in detail. Further, the crystal-controlled oscillator TCCO, the calibrator CAL, the marker unit MAR and the mixer unit MIX may be any conventional circuit arrangements which it will be unnecessary to describe in detail.

The magnified time base unit MTB, the walking strobe unit WS and the pulse width control unit PWCU will, however, be described in detail with reference to Figs. 2, 3, 4 and 8. For this purpose reference will first be made to Fig. 2 which shows part of the circuit of the magnified time base unit MTB.

This circuit produces a time base which gives rise to a trace on the screen of the cathode ray tube representing 2½, 7 or 15 miles at full scale deflection, the trace providing a magnified presentation of any desired portion of the trace of the long time base tube. The selection of the portion of the trace of the long time base tube which is to be magnified is effected by delaying the triggering of the magnified time base a variable time after the PRF pulse. The delay is not continuous but the adjustment is effected in 5 mile steps as a coarse adjustment and in 1 mile steps as a fine adjustment after the PRF pulse.

Figure 5:
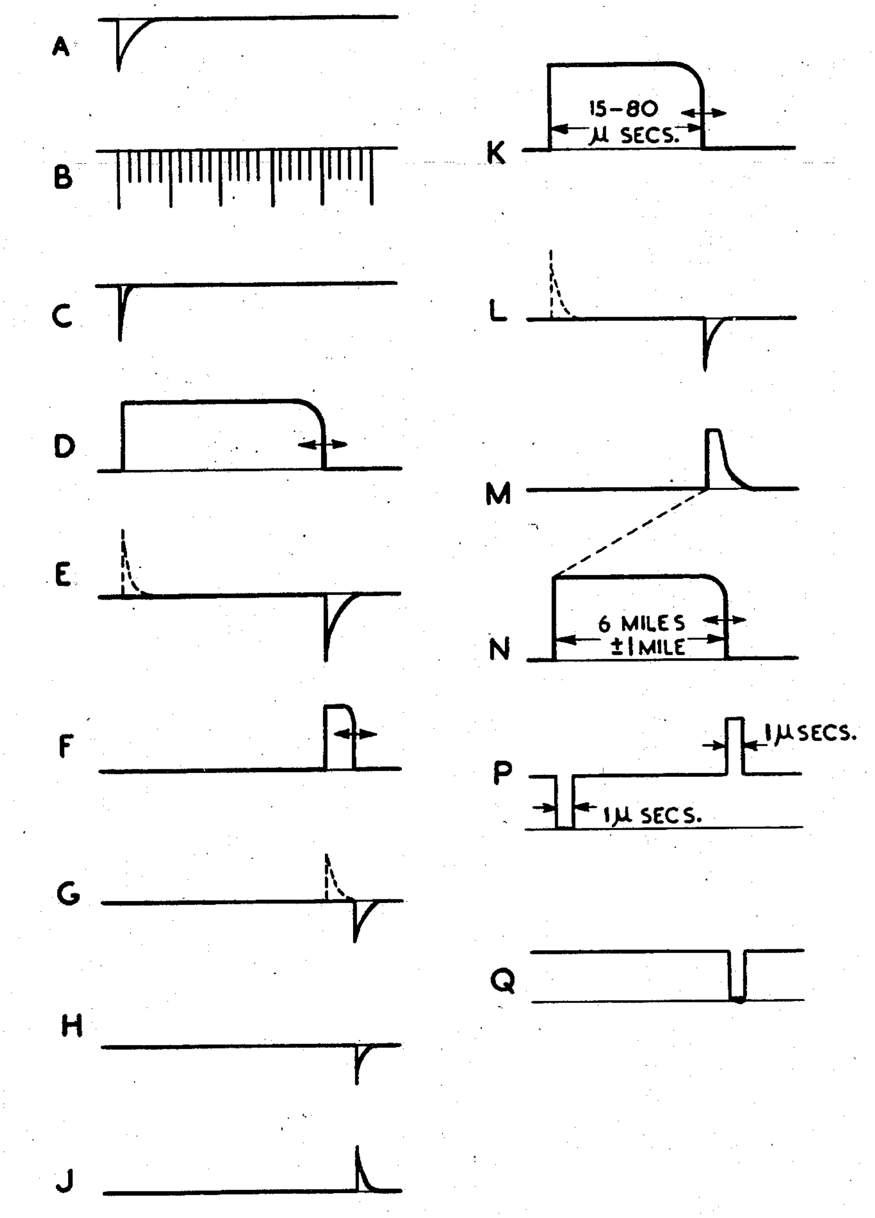
Fig. 5 shows certain waveforms developed in the walking strobe unit.

The delay is provided by a valve V3 which is arranged in a circuit of the same general type as that described in co-pending United States application, Serial No. 762,375 filed July 21, 1947, United States Patent No. 2,549,874 granted April 24, 1951. The valve is triggered by the negative-going PRF pulses derived from the marker unit MAR (Fig. 1). These pulses are fed from terminal T1 (Fig. 2) through a differentiating circuit C5, R8 to the cathode of the double diode V2. Since these pulses have a sharp front edge and a sloping back edge, as shown in Fig. 5A, only the front edge will give a peak on differentiation. This peak will be as shown in Fig. 5C, and will be transmitted through the diode V2 to the grid of the delay valve V3. As a result of this the anode voltage begins to fall as described in the above-mentioned specification, and the voltage of the control grid and cathode also to fall due to feedback from the anode circuit via the condenser C6 so that the section of diode V2 connected to the control grid is cut off. A positive-going square waveform is produced on the screen grid of V3 and it is this waveform that introduces the delay. As shown in co-pending United States application, Serial No. 762,375 filed July 21, 1947, United States Patent No. 2,549,874 granted April 24, 1951, the back edge of this waveform occurs when the rising cathode voltage reaches the fixed suppressor grid voltage. The anode is then cut off and the valve current all goes to the screen with a consequent reduction in the voltage at the screen grid. It will therefore be seen that if a series of negative-going pulses are applied to the suppressor grid, the back edge of the screen grid waveform can be synchronized with any desired one of these pulses by suitably adjusting the maximum anode voltage on V3 by means of the potentiometer R2. Actually negative-going 5-mile pulses (Fig. 5B) derived from the calibrator unit CAL (Fig. 1) are fed to the suppressor grid via terminal T2 and condenser C7 so that the back edge of the screen grid waveform, shown in Fig. 5D, may be synchronised with a selected 5-mile pulse. In order to ensure accurate synchronisation, the potentiometer R6 is provided for varying the bias potential applied to the suppressor grid.

The positive-going screen grid waveform is differentiated by C8 and R14 and the positive-going peak is suppressed by the other diode section of V2 (Fig. 5E). The negative-going peak is fed via terminal T4 to the walking strobe unit (Fig. 3) and via the condenser C9 to the cathode of the double diode V5 which is part of a delay circuit which operates in a similar manner to that just described. A positive-going square waveform (Fig. 5F) is obtained from the screen grid of V6 and the back edge of the waveform may again be locked to a selected one of a series of negative-going pulses applied to the suppressor grid but this time 1-mile pulses (Fig. 5B) are applied to the suppressor grid via terminal T3 and condenser C14. The positive-going screen grid waveform is differentiated by C15 and R28 and the positive-going peak is eliminated by the diode V5 while the negative-going peak (Fig. 5G) is fed via the diode V7 to the time base generating valves. The cathode of the diode V7 has a positive bias applied to it to ensure that none of the negative-going 1-mile pulses break through to the subsequent stages.

It has already been explained that the calibration unit CAL produces, under the control of the temperature controlled crystal oscillator TCCO, P. R. F. pulses and 5-mile and 1-mile calibration pulses. These calibration pulses occur after the P. R. F. pulses to represent 5-mile and 1-mile steps of range respectively. Since the negative-going portion of the screen grid voltage of the valve V3 (the waveform of which is shown in Figure 5D) can be synchronised with any selected 5-mile pulse, say the $m$th pulse after the P. R. F. pulse, by means of the potentiometer R2, and since the negative-going portion of the screen grid voltage of the valve V6 (the waveform of which is shown in Figure 5F) can be synchronised with any selected 1-mile pulse occurring after the selected 5-mile pulse, say the $n$th 1-mile pulse after the $m$th 5-mile pulse, by means of the potentiometer R16, the negative-going pulse (illustrated in Figure 5G) fed to the time base generating valves occurs after the P. R. F. pulse at a time representing $5m+1n$ miles of range where $m$ and $n$ are integers which have values selected by the adjustment of the potentiometer R2 and the potentiometer $R_{16}$ respectively.

The circuit of the time base generating valves is not shown, as any circuit suitable for generating a sawtooth waveform may be employed and such sawtooth generator circuits are well known. The magnified time base circuit MTB also includes amplifiers (not shown) for amplifying the received signal, the calibration pulses or both and feeding either, or both of them to the Y plates of a cathode ray tube (not shown). The amplifiers and cathode ray tube may be of any conventional and well known design.

Consideration will now be given to the walking strobe unit shown in Figs. 3 and 4. This unit may be conveniently divided into three sections:

(a) The variable delay circuit
(b) The target marker delay circuit
(c) The walking strobe circuit The variable delay circuit is triggered by the negative-going peak obtained after differentiation of the output of V3 (Fig. 2) of the magnified time base unit. This peak, it will be remembered, is locked to a selected one of the 5-mile pulses. The variable delay circuit produces a positive-going pulse which is delayed behind the triggering pulse by an amount which may be varied between 15 and 90 microseconds. This positive pulse is employed to trigger the target marker delay circuit and the walking strobe circuit.

The target marker delay circuit is similar to the variable delay circuit but the delay introduced thereby is normally about 6 miles and only a small adjustment of approximately ±1 mile may be effected. The circuit produces a 1 microsecond negative-going pulse which appears on the magnified time base trace as the target range marker.

The walking strobe circuit produces a negative-going pulse which is fed to the magnified time base unit and appears at any position on the time base as intensity modulation. Hereinafter the appearance of this pulse on the time base will be termed the "walking strobe." The walking strobe is capable of locking to any echo returned by an aircraft which is moving with any speed up to 600 miles an hour in any direction. The return signal from the aircraft is fed to the walking strobe circuit and to lock the walking strobe to any echo, an auto-manual switch is provided, with a control for the manual adjustment of the position of the walking strobe. With the switch in the manual position, the walking strobe is set to a suitable position on a certain part of the tube known as the "active region" whereupon the switch is thrown to the auto-position and the walking strobe locks to the echo signal as the signal overlaps therewith. Further in the walking strobe circuit two voltages are produced, one of which is linearly dependent on the residual range of the aircraft while the other is linearly dependent upon the radial velocity of the aircraft. These voltages are fed to the pulse width control unit.

Figure 6:
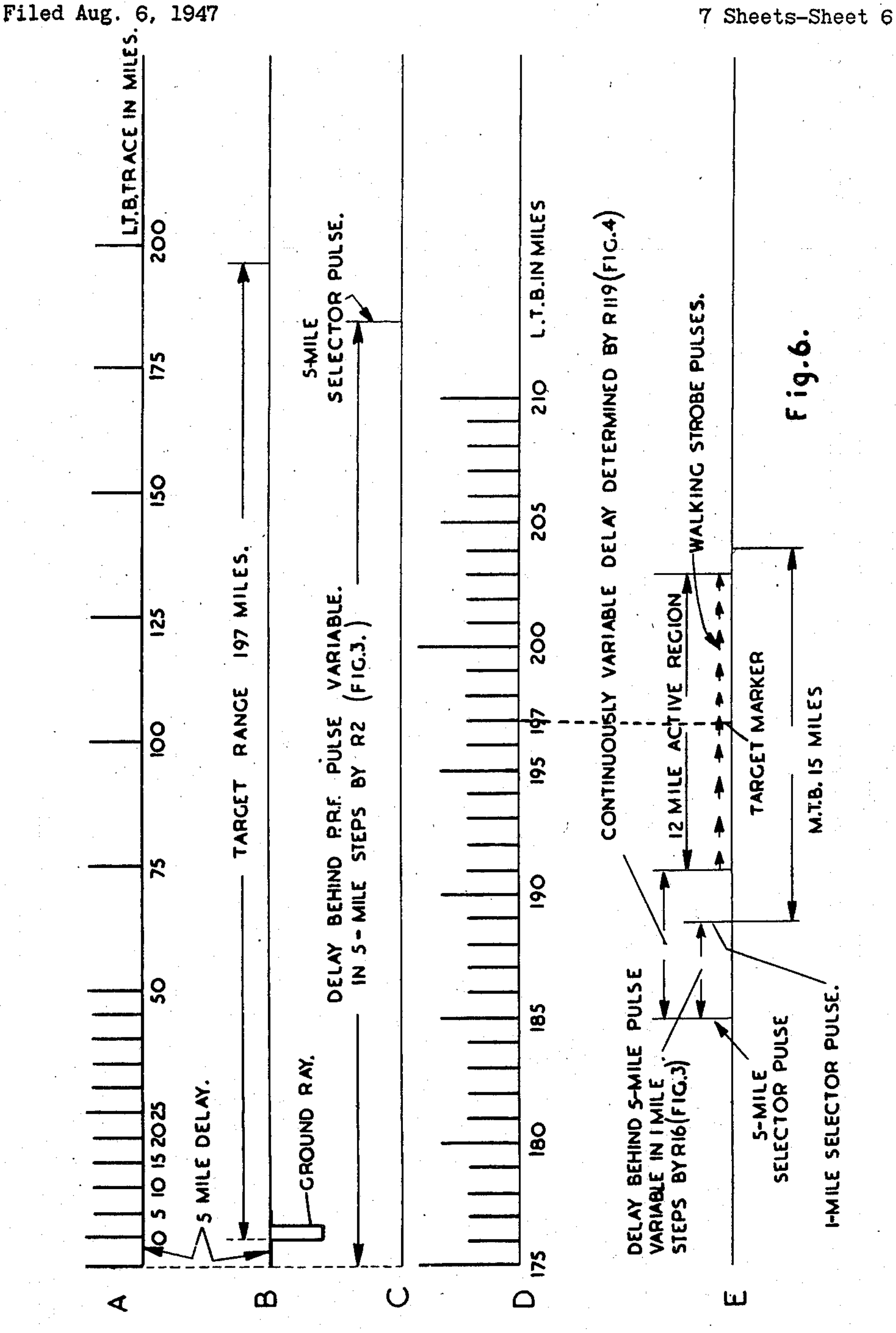
Fig. 6 shows diagrammatically the signals indicated on the long and magnified time bases.

The relation between the various delays introduced by the different circuits will be better understood from a consideration of Fig. 6. Fig. 6A represents the long time base trace and shows the 5-mile delay between the PRF pulse and the zero position on the trace, at which zero position the transmitter is pulsed. The long time base trace is divided into 5 and 25-mile sections. Fig. 6B shows the transmitter pulse and the target range of 197 miles. Fig. 6C shows a possible position for the 5-mile selector pulse in which the pulse is locked to the 38th five mile pulse i. e. at 185 miles. Fig. 6D shows the portion of the long time base trace between 175 and 210 miles on an enlarged scale. Fig. 6E shows the 5-mile selector pulse locked at 185 miles and the 1-mile selector pulse locked at 189 miles. The 1-mile selector pulse triggers the magnified time base and the trace is indicated as covering a range of 15 miles. Now the target marker has to be positioned at 197 miles and the 12-mile active region extends for 6 miles each side of the target marker i. e. from 191 to 203 miles. The delay introduced by the variable delay circuit must therefore be set for the difference between 185 and 191 miles i. e. 6 miles and the target marker will then be in the correct position.

Figures 2, 3:
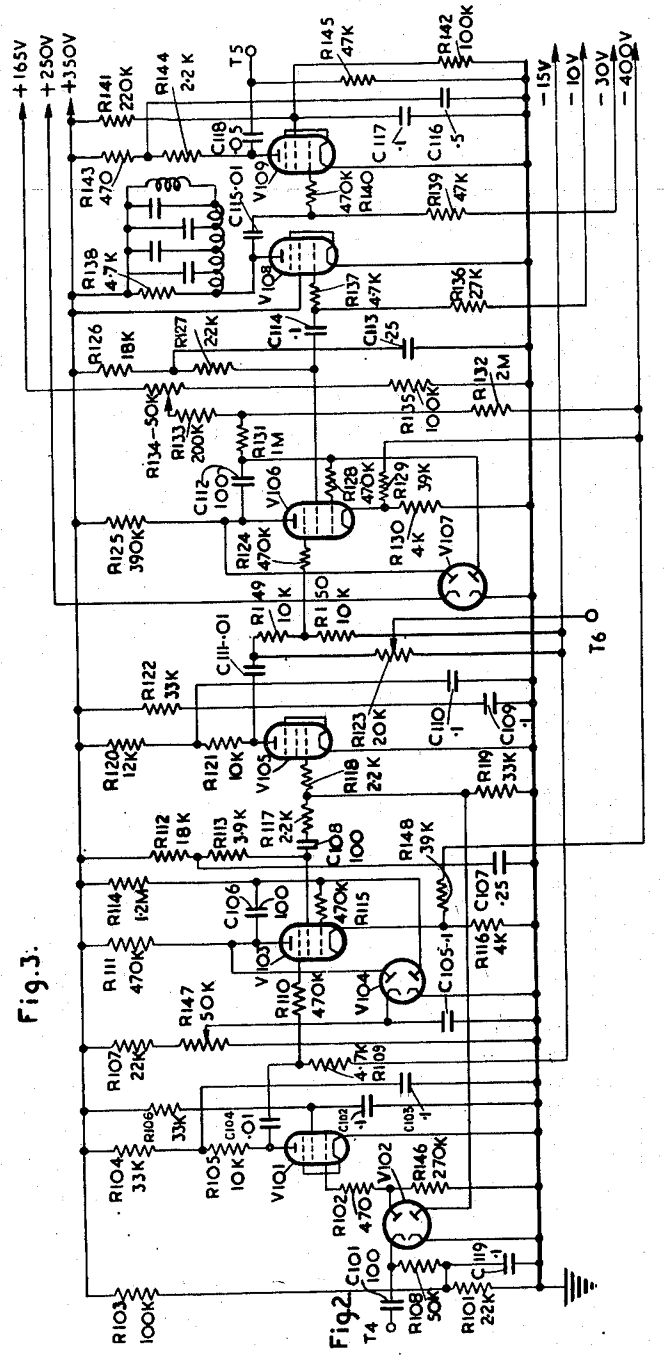
Figs. 3 and 4 show the circuit of the walking strobe unit.

Referring now to Fig. 3, the variable delay circuit consists of the valves V101, V102, V103, V104 and V105. The negative-going pulse from the magnified time base unit (Fig. 5E) is fed via terminal T4 to the differentiating circuit C101, R108 and the output (Fig. 5H) is fed to the cathode of the diode V102. The 5-mile pulses which are applied to the suppressor grid of the valve V3 (Figure 2) may break through the valve to produce negative voltage pulses on the screen grid of the valve V3 (Figure 2) and at the terminal T4. In order to prevent this break-through from affecting the variable delay circuit, the diode V102 has a positive bias of approximately 6 volts applied to its cathode. The negative-going pulses from the anode of V102 are then applied to the control grid of V101 which is normally conducting. A positive-going pulse (Fig. 5J) is thus obtained at the anode of V101 and is fed to the suppressor grid of V103 which forms part of a delay circuit of the type disclosed in United States application, Serial No. 762,375 filed July 21, 1947, United States Patent No. 2,549,874 granted April 24, 1951. A positive-going square wave (Fig. 5K) will be obtained at the screen grid of V103 the width of which is variable between 15 and 80 microseconds by adjustment of the potentiometer R147. The screen waveform is now differentiated by C108, R117 and R119 (Fig. 5L) the positive peaks being removed by the other half of the diode V102. The negative peaks are applied to the grid of V105, which is normally conducting and produce at the anode a positive-going substantially square waveform (Fig. 5M). This waveform will be delayed behind the input triggering pulse by an amount dependent upon the active region delay control i. e. the potentiometer R147.

The output from V105 is fed via C111, R149 and R150 to the suppressor grid of V106 which together with V107, V108 and V109 form the target marker delay circuit. The valve V106 forms part of a delay circuit of the type described in copending United States application, Serial No. 762,375 filed July 21, 1947, United States Patent No. 2,549,874 granted April 24, 1951. In this case the potential to which the anode of V106 returns is fixed and the potential to which the grid leak R131 is connected is variable by means of the potentiometer R134. The width of the screen waveform obtained with this circuit corresponds approximately to 6 miles and variation of R134 enables the width to be varied by ±1 mile. The screen waveform from V106 (Fig. 5N) is fed to the control grid of V108, the bias potential of which is normally −10 volts so that the valve is cut off. The screen waveform is positive-going and thus causes the valve to conduct and a negative-going waveform is obtained from the anode. The anode load of V108 includes a network having a delay of about ½ microsecond. This network is short-circuited at the far end and the resultant waveform at the anode will thus consist of a 1 microsecond negative-going pulse at the beginning of the positive-going grid waveform and a 1 microsecond positive-going pulse at the end of the grid waveform (Fig. 5P). The output from V108 is fed via C115 and R139 to the control grid of V109 which is normally cut off so that the 1 microsecond positive-going pulse is alone effective, going a 1 microsecond negative-going pulse at the anode of V109 (Fig. 5Q). This pulse is fed via C118 and terminal T5 to the grid of the cathode ray tube in the magnified time base unit and appears as the target marker blackout pulse.

It will be thus seen that there are two controls for setting the target marker at the desired range. The first is the potentiometer R2 (Fig. 2) in the magnified time base unit which determines the point at which the variable delay circuit is triggered and the second is the potentiometer R147 (Fig. 4) which determines the extent of the delay introduced by the variable delay circuit before the target marker delay circuit is triggered. These two controls function respectively as the coarse and fine controls for setting the target marker (see Fig. 6).

Figure 4:
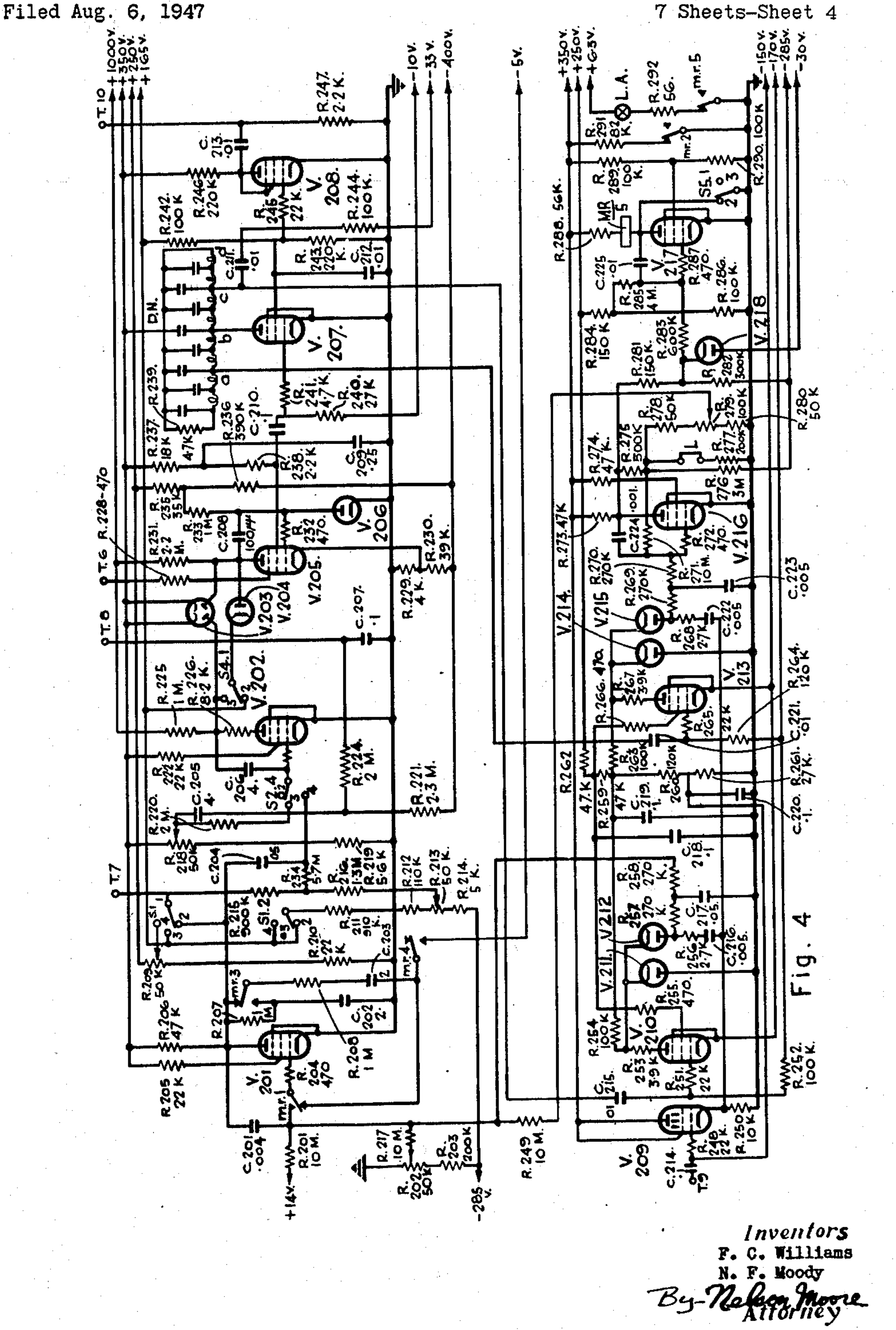

The output of the variable delay unit is also fed via C111 and R123 to terminal T6 leading to the circuit of Fig. 4. This circuit may for convenience be divided into two parts; first that part, consisting of V205, V206, V207 and V208, which produces the walking strobe pulse and second that part, consisting of the remainder of the circuit, which provides the range and velocity voltages and which causes the walking strobe to lock on to an echo.

The walking strobe pulse is generated by the valves V205, V206, and V207, V205 being triggered by the positive-going waveform applied to terminal T6 from Fig. 3. In the present arrangement, the walking strobe consists of two overlapping pulses shown in Figs. 7B and C. These two strobe pulses are phase-reversed and fed as negative-going pulses to the cathodes of two strobed diodes V212 and V215, the echo signals, which are positive-going, being fed via terminal T9 to the anodes of the two diodes in parallel. The current flow through the diodes will thus depend on the degree of overlap between the echo signal and each strobe pulse. One pulse, hereinafter termed "strobe 1" has a width of 1¼ microseconds while the other pulse, hereinafter termed "strobe 2" has a width of 2½ microseconds, the front edges of the two pulses being coincident. In the absence of a signal the pulses remain stationary on the time-base but overlapping of the signal with strobe 1 considered individually tends to cause the pulses to move to the left while overlap of the signal with strobe 2 tends to cause the pulses to move to the right. The circuit is so arranged that a balance is achieved when the centre of the signal is at the centre of strobe 2. The overlap of the signal with strobe 1 is then one half the overlap with strobe 2 and if $i_1$ is the current due to strobe 1 and $i_2$ is the current due to strobe 2, then $i_1=\frac{1}{2}i_2$. The current due to strobe 2 is passed through a phase reversing valve V216 which reduces the current to half its value and the two currents are then fed to the grid circuit of the valve V201. In the particular case under consideration the sum of the currents is zero and hence there will be no current flow into the condenser C201 which couples the anode of the valve to the grid. The anode voltage thus remains steady, and the strobes remain stationary.

The voltage variations of the anode of the valve V201 control, in a manner to be explained in detail later, the movement of the walking strobe along the magnified time base. The arrangement is such that for each value of the anode voltage there will be a definite velocity of the walking strobe along the magnified time base. The anode voltage of the valve V201 will thus be termed the "velocity" voltage and the valve itself will be termed the "velocity" valve.

Now flow of current into the condenser C201 will cause the anode voltage of the velocity valve V201 to fall linearly while flow of current out of the condenser will cause the anode voltage to rise. Suppose that the echo signal is completely within strobe 1. Then $i_1=i_2$ and the current due to strobe 2 is phase reversed and halved by the valve V216 so that the resultant current is $\frac{1}{2}i_2$, and flows out of the condenser and the velocity voltage rises linearly. The circuit is so arranged that, as the velocity voltage rises, the strobes move to the left to bring the echo signal towards the centre of strobe 2. Similarly if the signal is entirely within strobe 2, $i_1=0$ and the current due to strobe 2 flows into the condenser C201 and the velocity voltage falls linearly. The strobes are then caused to move to the right. With no signal $i_1=i_2=0$ and the velocity voltage remains constant. The velocity voltage is integrated by V202 to give the residual range voltage which is fed to the cathode of V204, thereby controlling the timing of the walking strobe pulses as described in detail subsequently.

Assume that the echo signal is over-lapping one or both the strobe pulses. The circuit is so arranged that, under this condition, the current flow through the valve V217 is sufficient to maintain relay MR operated. With the relay operated, condenser C203 is charged to a voltage equal to the mean value of the velocity voltage. If now the signal fades, the current through V217 falls linearly with a time delay such that the relay MR releases if the fade has a duration of greater than approximately ⅛th second. When the relay releases the grid of V201 is disconnected and C203 in series with R208 is applied between the anode and grid of V201. The condenser then maintains the anode of the velocity valve at a steady value equal to the mean velocity voltage before the fade occurred.

Figure 7:
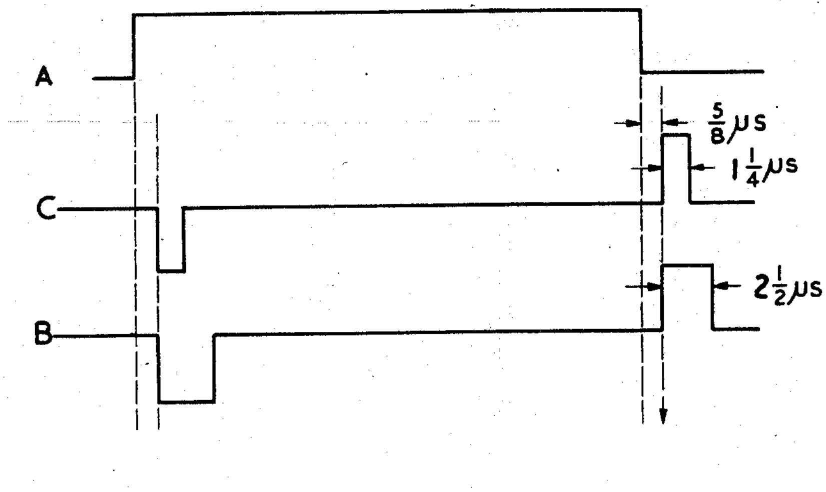
Fig. 7 shows the waveforms of the walking strobe and Fig. 8 shows the circuit of the pulse width control unit.

A detailed description will now be given of the circuit, commencing with the generation of the two walking strobe pulses. As previously mentioned, a positive-going trigger pulse is fed through terminal T6 to the suppressor grid of V205. The valve V205 forms part of a delay circuit of the type described in co-pending United States Application, Serial No. 762,375 filed July 21, 1947, United States Patent No. 2,549,874 granted April 24, 1951, and produces a positive-going wave-form (Fig. 7A) at the screen, the width of the waveform depending upon the voltage to which the anode is allowed to rise as determined by the cathode potential of the diode V204. The screen waveform is fed to the control grid of V207 which is normally biassed to cut off, the positive-going input waveform thus giving rise to a drop in anode voltage, producing (as shown in Fig. 7B) a negative-going anode waveform. The anode load of V207 includes a delay network DN one end of which is short-circuited while the other end is terminated by a resistance R239 equivalent to the characteristic impedance of the network. The network is so arranged that the delays introduced by the section *ab*, *bc* and *cd* are each equal to ⅝ microsecond. Hence at the point *a*, a negative-going voltage pulse waveform (Fig. 7B) will be produced delayed by ⅝ microsecond after the anode voltage drop at the point *b*. This waveform at *a* will have a width determined by the time taken for the waveform at *b* to travel to *d* and back from *d* to *a* less the time taken for the waveform at *b* to travel to *a* i. e. $(5-1)\frac{5}{8}=4\times\frac{5}{8}=2\frac{1}{2}$ microseconds. Similarly at *c* a negative-going voltage pulse waveform (Fig. 7C) will be produced delayed by a similar amount and having a width of 1¼ microsecond. Further the negative-going edge of the waveform from the screen of V205 will cause the generation of two similar positive-going pulses by the delay network. The output from the points *a* and *c* of the network is applied via C221, R264 and C215, R252 respectively to the control grids of V213 and V210. Both these valves are normally biassed to cut off so that only the positive-going pulses generated by the network are effective and it will be seen, therefore, that the timing of these two pulses i. e. strobe 1 and strobe 2 will be dependent on the width of the waveform obtained from the screen of V205 that is to say on the cathode potential of V204. The negative-going anode waveforms of V210 and V213 are fed to the cathode of V212 and V215 respectively, the diodes V211 and V214 being provided to prevent the anodes of V210 and V213 falling below earth potential. In addition the screen waveform from V207 which will be negative-going is fed to the control grid of V208 which phase reverses it, the positive-going anode waveform being fed via T10 to the cathode of the magnified cathode ray tube to brighten the trace in the region of the walking strobe pulse.

The echo signals, after amplification in circuits which are not shown in the drawing, are fed via terminal T9 and condenser C214 to the cathode follower valve V209. This valve is a 6V6 beam tetrode and provides a positive-going signal across the cathode resistance R250 which is fed in parallel to the anodes of the two diodes V212 and V215. The valves V210 and V213 are both Mazda valves, type SP41 while the four diodes V211, V212, V214 and V215 are all Mullard valves, type EA50.

The cathodes of the diodes V212 and V215 are normally maintained at +150 volts and this potential is reduced to earth by the respective strobe pulses. The anode of V212 is connected via R257 and R258 to the control grid of the velocity valve V201 while the anode of V215 is connected via R269 and R270 to the control grid of the phase reversing valve V216. Both anodes are thus normally at approximately earth potential while the incidence of a signal pulse raised their potential to a maximum of 110 volts. Thus when there is no overlap between the echo signal and strobe pulses, both diodes will be cut off. If, however, a signal overlaps with strobe 1, the diode V212 conducts and the condenser C216 receives a charge. This charge leaks away through the filter circuit consisting of R257, C217 and R258 and constitutes a current flow out of condenser C201. Similarly, the diode V215 conducts and the condenser C222 receives a charge when the echo signal overlaps strobe 2. This charge leaks away through the filter circuit consisting of R269, C223 and R270 and constitutes a current flow out of condenser C224.

The condenser C224 is connected between the anode and grid of the phase-reversing valve V216 which is provided with negative feedback due to the connection of resistances R271 and R275 between the control grid and anode. The circuit is so arranged that, when there is no overlap between strobe and signal pulses, there is zero current flow through the grid leak R271. The voltage at the control grid is then −2 volts and hence the voltage of the junction of R275 and R276 will also be −2 volts. Taking into consideration the current flow through R276, R277, R278, R279 and R280, it can be shown that the anode voltage of V216 at this time is 35 volts. Now suppose that a strobe current of $i_2$ microamps flows out of the condenser S224. The anode voltage of V216 begins to rise and, owing to the feedback through R275, and R271, the grid voltage also increases and grid current begins to flow. Eventually the state is reached at which the current flow through R270 and the current flow through R272, i. e. the current flow through R271, balance and the potential at the junction of R270 and R272 becomes steady. No further current flows out of the condenser C224 and hence the anode voltage remains steady. The junction of R275 and R276 must now be at a voltage given by $10i_2-2$ and hence the anode voltage of V216 will be given by $10i_2-2+\frac{1}{2}$ (sum of the currents in microamps through R271, R266, R277, R278, R279 and R280)

$$=10i_2-2+\tfrac{1}{2}[i_2+(285+10i_2-2)/3+(10i_2-2)/0.2+(10i_2-2)/0.2]$$
$$=35+62i_2 \text{ approximately.}$$

It will be explained subsequently that the grid potential of V201 is approximately −5 volts so that the current through R249 flowing into the condenser C201 will be given by $K(10i_2-2+5)/10$ microamps which is approximately $K.i_2$ where K depends on the setting of the potentiometer R279. The latter is set so that, as explained previously, the current flowing into the condenser is $\frac{1}{2}i_2$ i. e. $K=\frac{1}{2}$.

It will thus be seen that the current flow due to overlap between the echo signal and strobe 1 passes out of the condenser C201 while that due to overlap between the echo signal and strobe 2 passes into the condenser. The condenser C201 is connected between the anode and control grid of the valve V201 which is a Mazda type SP41. The arrangement is such that, with the relay MR operated, a D. C. bias within the grid base of the valve is applied to the control grid. This bias maintains the anode voltage steady while a flow of current into the condenser C201 causes the anode voltage to fall linearly while a flow of current out of the condenser causes the anode voltage to rise linearly. As previously mentioned, for each value of the anode voltage of the valve V201, there will be a definite velocity of the walking strobe along the magnified time base and the circuit components are so chosen that a velocity voltage of 165 corresponds to zero velocity of the walking strobe i. e. with a voltage of 165 at the anode of V201 there should be no current flow into or out of the condenser C201. The potentiometer R213 is provided to enable the circuit to be set up in accordance with this definition. For this purpose the switch S1 is set to position 3 when 165 volts is fed over bank 1 whereupon the potentiometer R213 is adjusted until there is no movement of the walking strobe along the time base. It should be explained at this point that with the switch S1 in position 4, a voltage from R209, variable from about 70 to 250 volts is fed to the control grid of V202 for test purposes, while with the switch S1 in position 2, the velocity voltage from the anode of V201 is fed to the control grid of the valve V202 assuming the switch S2 to be in position 4.

The valve V202 is arranged by virtue of the condenser C206 to integrate the velocity voltage fed to the control grid to provide voltage proportional to the residual range. The operation of this type of circuit is well known and depends upon the current flow through the resistance R234 which causes current to flow into or out of the condenser C206 which produces a gradual change of potential (increasing or decreasing) at the anode of V202. This change of potential which is proportional to the residual range is fed via bank 1 of the switch S4 in position 3 to the cathode of the diode V204 and, as previously explained, the changes in cathode potential control the timing of the walking strobe and hence the position the strobe occupies on the magnified time base. The circuit components are so chosen that a range voltage of 165 corresponds to the target range. With this definition it will be understood that when the walking strobe circuit is fed with 165 volts, the target marker delay circuit must be adjusted so that it produces a target marker pulse which is also at the target range. This adjustment is effected during the initial setting up of the equipment and for this purpose the switch S4 is set to position 2 so that 165 volts is applied to the cathode of V204 and the resistance R134 (Fig. 3) is adjusted until the target marker pulse sits at the centre of the walking strobe as observed on the magnified time base. Thereafter when the target marker pulse is set to a particular target range, the centre of strobe 2 of the walking strobe will coincide with the target range when the range voltage amounts to 165 volts.

In operation, the walking strobe pulses are manually adjusted to a suitable position in the active region whereupon the auto/manual switch S2 is thrown to the auto position and the walking strobe locks to the echo signal as this signal coincides with the walking strobe. However, prior to locking to the echo signal, the walking strobe should be stationary and hence a velocity voltage and a range voltage of 165 should exist during this period. It will be understood that this will not give rise to the transmission of misleading signals since the signal transmission is controlled by the velocity and range voltages only after the echo signal has locked to the walking strobe.

Hence prior to the locking of the walking strobe to an echo signal, the anode voltage of V201 should be 165. The valve V201 is a Mazda type SP41 and with the component values shown this value of anode voltage will be obtained with a D. C. bias of −5 volts. Under these conditions there will be a current flow of 1.9 microamps through R201 and this current would normally flow into the condenser C201 producing a fall in the anode voltage of V201. In order to prevent this, the resistance network R202, R203 and R217 is provided and the tapping of R202 is adjusted until a current of 1.9 microamps flows through R217 to balance the current flow through R201.

When the signal voltage overtakes the walking strobe it will initially be equally within both strobes. The currents through the diodes V212 and V215 will then be equal but the current flowing out of C201 due to the strobe 1 current will be twice the current flowing into C201 due to the strobe 2 current. There is thus a net current flowing out of C201 and the anode voltage of V201 will rise to its maximum value. As the aircraft approaches the point at which the exponential path is asymptotic to the circular path, the net current flowing out of C201 gradually decreases and the anode voltage of V201 will gradually fall until when the aircraft is over the target, which is arranged to be at the point where the circular and exponential paths merge, the anode voltage is again 165.

Finally it should be explained that the velocity and range voltages are fed to the pulse width control unit (Fig. 8) via terminals T7 and T8 respectively.

As previously mentioned, the relay MR is operated during the time that the walking strobe is locked to an echo signal and releases if the signal fades during this time. Prior to locking, the relay would normally be released but arrangements are provided for preventing the relay exerting any control during this period. The relay is located in the anode circuit of the valve V217, the anode of which is coupled to the control grid by the condenser C225. The valve is a Mazda type SP41. It will be noted that the grid side of the condenser is connected through R285 to the junction of R284 and R286 which forms a potentiometer across the 250 volt supply. The junction of R284 and R286 is thus at a voltage of 100 and, since the control grid is at a potential of approximately −2 volts, there is current flow of 25 microamps into the condenser C225. There is however, a current flow out of the condenser through R283 and this current flow depends on the anode voltage of V16. The circuit is arranged so that when echo signals above a predetermined level are being received, there is a resultant current flow into the condenser and the anode voltage of V217 falls, the current flow in the anode circuit being sufficient to maintain the relay operated. If the strength of the received signals is at the predetermined level, the currents into and out of the condenser balance and the anode voltage remains stationary with the relay just on the point of releasing. If the strength of the received signals falls below the predetermined level, there is a resultant current flow out of the condenser, the anode voltage rises and the anode current falls below the value required to maintain the relay operated. The relay thus releases to effect certain circuit changes which will be described subsequently.

It was pointed out previously that, with no current flow through the diode V215 i. e. no overlap between strobe and echo signal, the voltage at the anode of V216 is approximately 35. The junction of R281 and R282 is held at −30 volts by the diode V218 at this time so that a current of approximately 50 microamps flows out of the condenser C225 through R283. Taking into account the current flow through R285 it will be seen that a resultant current of 25 microamps flows out of the condenser C225. The anode voltage of V217 thus rises and the relay is in its de-energised condition as previously explained. If now the diode V215 passes current i. e. there is overlap between the signal and strobe pulse, the anode voltage of V216 rises as previously explained. This rise in anode voltage will be without effect until the current flow through R281 and R282 changes sufficiently to make the cathode of V218 positive with respect to the anode i. e. the junction of R281 and R282 is more positive than −30 volts. The diode V218 then ceases to conduct and the current flow out of the condenser C225 through R283 begins to decrease. The circuit is so arranged that when the anode voltage of V216 reaches 112, the junction of R281 and R282 is at −17½ volts when the current flow into C225 balances the current flow out of C225 and the anode voltage of V217 remains stationary with the relay just about to operate. Further increase in the anode voltage of V216 causes the current flow through R283 to decrease below 25 microamps so that there is now a resultant current flowing into the condenser and the anode voltage of V217 falls and the relay operates.

If the strength of the echo signal falls below the predetermined level, the junction of R281 and R282 will return to −30 volts and the anode voltage of V217 will rise with a time constant which depends on the values of C225, R283 and R285. With the values shown in the diagram, the time constant is such that the relay MR will release if the fade lasts for longer than ⅛th second. If the signal reappears during this interval, however, relay MR remains operated, the energising of the relay being more rapid than the de-energising owing to the provision of the diode V218 which limits the current which can flow out of the condenser C225.

It will be understood that, with an echo signal pulse width of 1 microsecond, the current flow through the diode V215 will be substantially proportional to the strength of the signal and hence the anode voltage of V216 is also proportional to the strength of the signal. Variation of the level at which the relay MR should release may be controlled by varying the amplification of the signal amplifying stages (not shown).

When relay MR is operated, i. e. there is overlap between the echo signal and strobe 2, contact *mr4* connects a source of −5 volts to the lower plate of C203 while the upper plate is connected through R208 and contact *mr3* to the anode of the velocity valve V201 via the smoothing network C202, R207. The condenser C203 is thus charged to a voltage equal to the mean velocity voltage plus the D. C. voltage applied to *mr4* (−5 volts). Further contact *mr1* connects the condenser C201 between the anode and grid of V201. When relay MR releases the condenser C201 is disconnected from the control grid of V201 and the condenser C203 is connected between the anode and control grid via *mr3*, R208 and *mr1*. The condenser then maintains the anode of V201 at a steady voltage and, since the grid voltage of V201 is approximately −5 volts at this time, the anode remains at a voltage equivalent to the mean velocity voltage before the fade took place. Further, at contacts *mr5*, the lamp LA is lighted and, at contacts *mr2*, the resistance R291 is connected across the 350 volt supply so that the consumption is independent of whether the relay is energised or de-energised.

As previously mentioned, the relay must not be allowed to de-energise while an echo signal is moving along the trace prior to locking to the walking strobe. For this purpose the switch S5 is provided and, in the position shown, bank 1 connects earth to the anode of V217 so that the relay is energised as long as the switch is in this position.

It will be understood that the charge on condenser C203 will eventually leak away so that the voltage between the anode and grid will fall. The circuit constants have been so selected, however, that the anode/grid voltage will remain substantially constant for fades lasting up to 1 minute. After this time the anode voltage will gradually fall so that the movement of the walking strobe along the time-base trace slows down and eventually remains stationary. If the signal reappears after this interval the walking strobe will have to be manually adjusted to the appropriate part of the active region where it will remain until the signal again locks to the strobe.

If the fade lasts for less than 1 minute, however, the echo signal should reappear on the time-base trace in such a position it will be within the region controlled by the walking strobe. Automatic control as described above will then come into operation immediately. It will be understood that it is only after a fade that the echo signal is ever within strobe 2 only. Normally when the echo signal locks to the walking strobe, the echo will be at the left hand edge of both strobes and will gradually progress to the centre of strobe 2 in which position it overlaps also with strobe 1.

Figure 8:
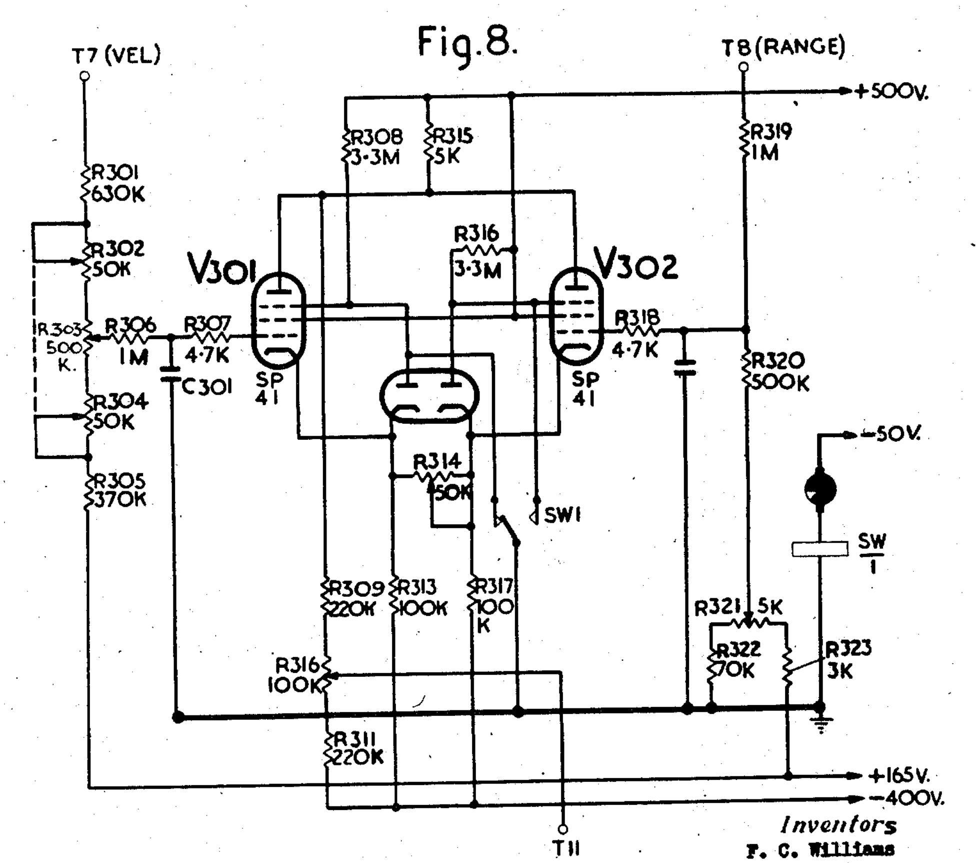

Consideration will now be given to the operation of the pulse width control circuit which is shown in detail in Fig. 8. As previously explained communication between either ground station and the aircraft is effected by variation in the pulse width of the transmitted signals. The normal pulse width is 3 microseconds and provision is made for varying this width between the limits of 2 and 4 microseconds. Filter circuits included in the aircraft equipment convert the pulse width modulation into amplitude modulation, the arrangements being such that a succession of 2 miscrosecond pulses produce an inaudible amplitude while a succession of 4 microsecond pulses produce an audible amplitude in the headphones.

Intermediate values of pulse width produce intermediate sound amplitudes.

The 3 microsecond pulses will be transmitted as long as the aircraft is on the correct track, the pilot then hearing a steady note in the headphones. When, however, the aircraft is off track the station sends out a series of pulses of widths alternately (3−D) microseconds and (3+D) microseconds, the quantity D being a function of the residual range and the rate of change of residual range. The quantity 100D, where D is measured in microseconds, is defined as the percentage modulation and the maximum modulation used in practice is 100 per cent. This, therefore, corresponds to alternating 2 microsecond and 4 microsecond pulses. The frequency at which the two widths alternate is 2 per second and the ratio of the time during which (3+D) microsecond pulses are transmitted to the period of time during which (3−D) microsecond pulses are transmitted is about 1 to 6 for dot transmission and 6 to 1 for dash transmission. Dash transmission indicates to the pilot that he is heading away from the ground station while dots indicate that he is heading towards the ground station. Zero modulation produces a steady note and indicates that the aircraft is flying along the correct track.

The pulse width control unit receives the range and velocity voltages from the walking strobe unit and controls the dot-dash width modulation of the transmission to keep the aircraft on track, the pulse width of the transmitted signals being controlled by a D. C. potential fed from the pulse width control unit to the modulator MOD.

The anodes of the two valves V301 and V302 are connected together and to the resistance chain R309, R316 and R311, the valves acting as cathode followers with a link R314 between their cathodes. The range voltage developed in the walking strobe circuit is fed via terminal T8 and resistances R318 and R319 to the control grid of the valve V302 while the velocity voltage is fed via terminal T7 and a chain of resistance R301 to R305 to the control grid of V301. The lower end of R305 is connected to a source of potential of 165 volts, corresponding to zero velocity while the lower end of R319 is connected to a source of potential which may be varied in the neighbourhood of 165 volts by R320. In the ideal case this will also be set to 165 volts corresponding to zero range.

The potential applied to the screen grids of the valves V301 and V302 will be 500 volts while the potential applied to the suppressor grids is prevented from rising above the cathode potential by the double diode V303. According to usual cathode follower principles, the cathodes will take up a potential approaching that of the highest of the control grid potentials which is in the neighbourhood of +100 volts so that the suppressor grids will be at approximately this voltage. Arrangements are, however, provided which enable the potential of the two suppressor grids to be brought down to earth potential alternately in synchronism with the operation of relay SW. This relay is controlled from a 2 impulse per second generator INT with a make-to-break ratio of 1:6. The earthing of either suppressor will have the effect of cutting off the associated valve i. e. the anodes of V301 and V302 are alternately cut-off at a frequency of 2 per second with an on/off ratio of 1:6. Clearly if the grid potentials of V301 and V302 are equal, then the alternate switching on and off will cause no voltage change across resistance R316 since the valves conduct equally. But if the grids are at unequal potentials then according as to which valve is conducting the heavier there will be a dot or dash square wave modulation of the anode waveform, and the amount of modulation will depend upon the amount by which the grids are unbalanced. The arrangement is such that if the control grid of V302 is lower in potential than the control grid of V301 then dot modulation takes place while for the reverse conditions dash modulation occurs.

As previously mentioned the pulse width control unit delivers D. C. voltages to the modulator for the control of the pulse width of the transmitted pulses. These D. C. voltages are fed via terminal T11 which is connected to the tapping on R316 which is adjusted so that when the valves V301 and V302 are balanced, the potential at the tapping point is 23 volts, the control exerted in the modulator being then such as to give a pulse width of 3 microseconds. If the valves V301 and V302 are unbalanced, the dot or dash modulation is superimposed on the steady voltage at the tapping to cause variations in the steady voltage within the limits of 10 volts (corresponding to a pulse width of 4 microseconds) and 36 volts (corresponding to a pulse width of 2 microseconds).

It was previously mentioned that the potentiometer R21 is not set to give exactly 165 volts on the grid of V302, but will be adjusted to something less than this in order to correct for aircraft receiver delays, the effect of which is to make the range appear greater than it actually is. The double ganged potentiometers R302 and R304 are used to correct for factors which are proportional to the velocity of the aircraft.

We claim:

1. A pulse echo circuit comprising a source of recurrent input signals, a source of locally generated recurrent signals, means responsive to said input and locally generated recurrent signals for deriving a control voltage substantially proportional to the duration of the coexistence of said input and locally generated recurrent signals with one another, a load circuit and a condenser, circuit means to feed said control voltage to said load circuit and to said condenser to charge said condenser to a voltage equivalent to the mean value of said control voltage, and switching means coupled to said source of recurrent input signals, said switching means being operative in response to a drop in signal amplitude to a selected minimum value of said input signal to cause said condenser to discharge slowly into said load circuit.

2. An echo signal detecting circuit comprising, signal receiving means, local signal generating means having an output with two recurrent substantially rectangular wave forms with coincident edges, the width of one wave form being greater than the sum of the other wave form plus an echo signal received by said signal receiving means, a first deriving means connected to said local signal generating means for producing a first current in proportion to the coexistence duration of the received echo signal and the shorter wave form, a second deriving means connected to said local signal generating means for producing a second current in part of said proportion to the coexistence duration of a received echo signal and said longer wave form, a control deriving means connected to said first and second deriving means for deriving a control voltage proportional in magnitude and phase relation to the difference between said first and second currents, a load circuit and a condenser, means connecting said control deriving means and said load circuit and said condenser for feeding the derived control voltage thereto to charge said condenser to a voltage equivalent to the mean value of said control voltage and switching means connected in the circuit of said condenser and controlled by said signal receiving means for operation in response to a drop in signal amplitude to a selected minimum value of received input signal voltage to cause said condenser to discharge through said load to produce a substantially constant control voltage equal to the mean value.

3. Circuit arrangements comprising a source of recurrent input signals, a source of locally generated recurrent signals, control voltage means for deriving a control voltage substantially proportional to the duration of co-existence of said input and locally generated signals, means coupling said sources of recurrent input and locally generated signals to said control voltage means, a load circuit and a condenser, means for feeding said control voltage to said load circuit and to said condenser whereby said condenser is charged to a voltage equivalent to the mean value of the control voltage and switching means operative in response to the drop in signal amplitude to a predetermined value to cause said condenser to discharge slowly into said load circuit.

4. Circuit arrangements comprising a source of recurrent input signals, a source of locally generated recurrent signals, control voltage means for deriving a control voltage substantially proportional to the duration of co-existence of said input and locally generated signals, means coupling said sources of recurrent input and locally generated signals to said control voltage means, a load circuit, a condenser, means for feeding said control voltage to said load circuit and to said condenser to charge said condenser to a voltage equivalent to the mean value of the control voltage, and a relay having a contact in the circuit of the condenser, means coupling said contact to said control voltage and further means coupling said contact to said load circuit, means responsive to the strength of the incoming signal and coupled to said relay, said relay being controlled in accordance with the strength of the incoming signal by said last named means to vary the positioning of said contact so as to feed said control voltage to said condenser if the strength of the input signals is above a minimum value and to connect said condenser to said load circuit if the strength of the input signals is below said minimum value.

5. Circuit arrangements according to claim 4 wherein said means responsive to the strength of the incoming signal comprises a thermionic valve having said relay in the anode circuit and a condenser connected between the anode and control grid, means for causing current to flow into or out of said condenser according to the strength of the input signal to vary the charge upon said condenser and in turn to vary the current flowing in the anode circuit of said thermionic valve, said varying anode current energizing the relay when the strength of the input signal is above the minimum level and de-energizing the relay when the input signal is below said level.

6. The combination set forth in claim 4, said source of locally generated recurrent signals having an output with two recurrent substantially rectangular wave forms with coincident leading edges.

7. The combination set forth in claim 4, said source of locally generated recurrent signals having an output with two recurrent substantially rectangular wave forms with coincident trailing edges.

8. Circuit arrangements comprising a source of recurrent input signals, means for generating local signals consisting of two recurrent substantially rectangular waveforms having coincident edges and different widths, the width of the second of said waveforms being greater than the width of the first of said waveforms by an amount in excess of the width of an input signal, means coupled to said input signals and to said local signals for obtaining a first current in proportion to the duration of co-existence of the input signals and the first of said waveforms and means coupled to said input signals and to said local signals for obtaining a second current in proportion to half of the duration of co-existence of the input signals and the second of said waveforms, means responsive to said first and second currents including means for deriving a control voltage proportional in magnitude and sense to the difference between said first and second currents, a load circuit and a condenser, means coupling said control voltage, load circuit, and condenser, and feeding said control voltage to said load circuit and to said condenser to charge said condenser to a voltage equivalent to the mean value of the control voltage and switching means coupled to said source of recurrent input signals, said switching means including means operative in response to a drop in signal amplitude below a predetermined minimum value to cause said condenser to discharge through said load so that a substantially constant control voltage equal to the mean value is obtained.

9. Circuit arrangements for the generation of a control voltage comprising an input adapted to receive a plurality of input signals, square wave generator means, said square wave generator means including means to produce two recurrent square waves having coincident edges and different widths, said square wave generator means having an output operatively connected thereto and including means feeding said recurrent square waves to said output, means coupling said input to said output, first comparison means responsive to the period of co-existence of said input signals with one of said recurrent square waves, said first comparison means including means producing a first current bearing a constant ratio to said period of co-existence, second comparison means responsive to the period of co-existence of said input signals with the other of said recurrent square waves, said second comparison means including means producing a second current bearing a fractional part of said ratio to said last named period of co-existence, voltage output means, means coupling said first comparison means and said second comparison means to said voltage output means, said voltage output means including means responsive to the sense and magnitude of said first current and said second current for producing a control voltage which varies with variations in the magnitudes and senses of said first and second currents.

10. Circuit arrangements as claimed in claim 9 wherein said square wave generator means includes a valve circuit for the production of a plurality of substantially rectangular waveforms, delay means, means connecting said delay means to said valve circuit for feeding said plurality of substantially rectangular waveforms to said delay means, said delay means including two terminals electrically spaced from one another, said delay means being so constructed that said two recurrent square waves having coincident leading edges and different widths appear respectively at said two terminals.

11. Circuit arrangements as claimed in claim 9 wherein said voltage output means includes a valve having an anode and a control grid, a capacitor connected between said anode and said control grid and means coupling said first current and said second current to said capacitor to vary the charge upon said capacitor in accordance with the sense and magnitude of said first current and of said second current.

12. A pulse echo circuit comprising a source of recurrent input signals, a source of locally generated recurrent signals, means responsive to said input and locally generated recurrent signals for deriving a control voltage substantially proportional to the duration of coexistence of said input and locally generated recurrent signals with one another, a load circuit and a condenser, circuit means to feed said control voltage to said load circuit and to said condenser to charge said condenser to a voltage equivalent to the mean value of said control voltage, and switching means coupled to said source of recurrent input signals and operative at a selected minimum value of said input signal to cause said condenser to discharge slowly into said load circuit, said switching means comprising a relay having a pair of contacts in the circuit of said condenser, means coupling one of said contacts to said control voltage and further means coupling the other of said contacts to said load circuit, said relay being controlled by said input signals to so position said contacts as to couple said condenser to said control voltage at values of input signal above said selected minimum.

13. The system of claim 12 in which said relay is controlled by said input signals to so position said contacts as to couple said condenser to said load circuit at values of incoming signal below a selected minimum.

14. The system of claim 13 including an electron tube, said relay being connected in the plate circuit of said tube, a second condenser connecting the plate and control grid circuits of said tube, circuit means responsive to the strength of said input signal for causing current to flow into or out of said second condenser whereby said relay is energized at selected upper values of input signal strength and deenergized at selected lower values thereof.

FREDERIC CALLAND WILLIAMS.
NORMAN FRANK MOODY.

References Cited in the file of this patent

UNITED STATES PATENTS

| Number | Name | Date |
|---|---|---|
| 2,433,667 | Hollingsworth | Dec. 30, 1947 |
| 2,461,144 | Cook | Feb. 8, 1949 |
| 2,516,356 | Tull et al. | July 25, 1950 |